A. J. MAPES.
Wagon-Tongue Support.
No. 108,610.                         Patented Oct. 25, 1870.
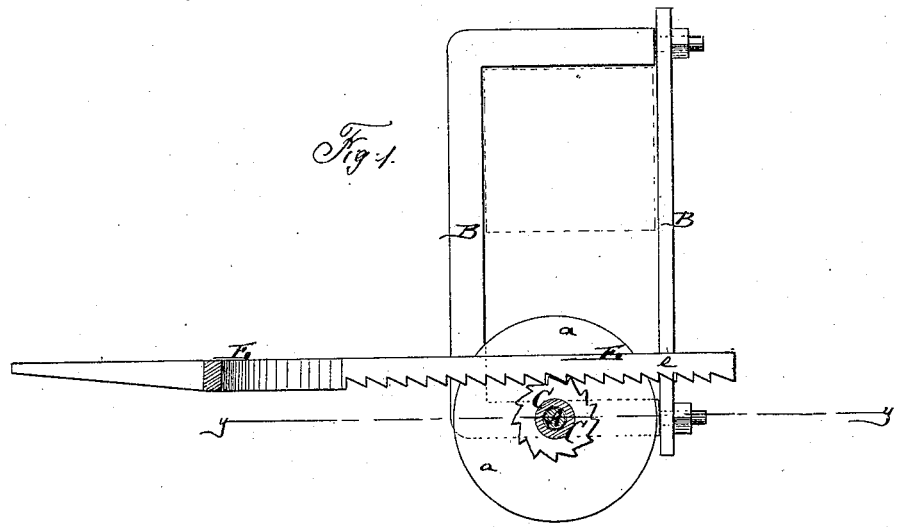
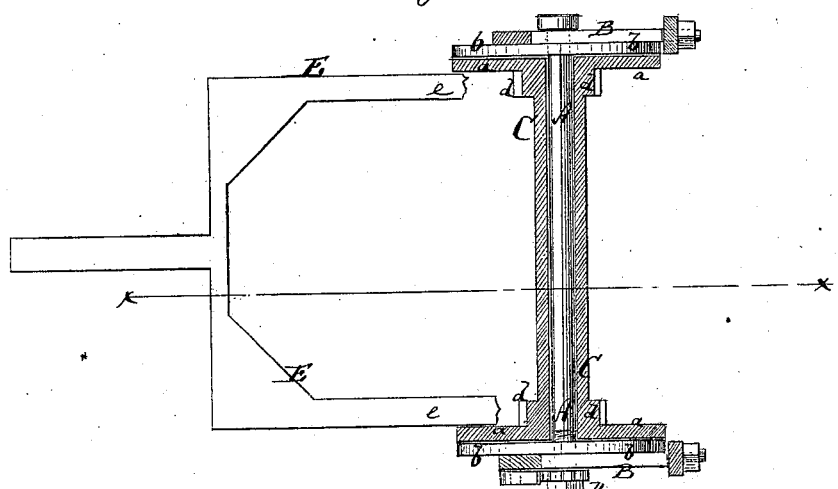
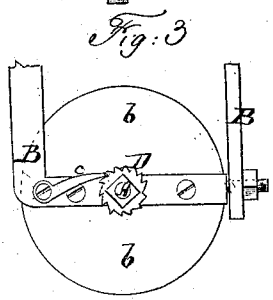
Witnesses:                           Inventor:

United States Patent Office.

ANDREW J. MAPES, OF INDEPENDENCE, MISSOURI.

Letters Patent No. 108,610, dated October 25, 1870.

IMPROVEMENT IN TONGUE-BRACES AND BALANCES FOR WAGONS.

The Schedule referred to in these Letters Patent and making part of the same

*To all whom it may concern:*

Be it known that I, ANDREW J. MAPES, of Independence, in the county of Jackson and State of Missouri, have invented a new and improved Tongue-Brace and Balance for Wagons and other vehicles; and I do hereby declare that the following is a full, clear, and exact description thereof, which will enable others skilled in the art to make and use the same, reference being had to the accompanying drawing forming part of this specification, in which—

Figure 1 represents a vertical longitudinal section of my improved tongue-brace and balance, $x\,x$, fig. 2, being the section line.

Figure 2 is a top view, partly in section, of the same, $y\,y$, fig. 1, being the section line.

Figure 3 is a detail end view of the same.

Similar letters of reference indicate corresponding parts.

The object of this invention is to provide a brace or support for the poles or tongues of wagons, carriages, buggies, sleighs, and other vehicles, so as to hold the same in the required horizontal position, and remove their absolute weight from animals holding them suspended.

The invention consists in the application of a friction-sleeve to the axle or frame of the vehicle, the said sleeve being, by a brace, connected with the tongue or pole, so as to sustain the same in about a horizontal position, allowing it, however, to be lowered by force, and being, after that, always ready to again sustain it in the former position.

A in the drawing represents a horizontal shaft, suspended by frames or clevises B B from the front axle, or any other part of the frame of a wagon or other vehicle.

Upon the shaft A is hung a loose sleeve or roller, C, which has projecting flanges, $a\,a$, at the ends.

These flanges or disks are, at their faces, in contact with similar disks, $b$, hung on the shaft A.

D is a nut, fitted upon the threaded end of the shaft A. It serves to press the disks $b$ with suitable power against the disks $a$, and to thereby hold the sleeve or roller C so firm that a certain amount of friction will be required for turning the sleeve.

The edge of the nut is toothed for the reception of a pawl, $c$, by which the nut is locked in any desired position.

$d\,d$ are ratchet-wheels, mounted upon the sleeve C, near to the ends of the same.

E is a brace, for connecting the sleeve with the tongue or pole.

The rear end of this brace is forked, each arm $e$ being toothed at the lower edge to fit upon one of the ratchet-wheels. The front end of the brace E is turned up, and secured by bolts or otherwise to the under side of the tongue or pole, or to the cross-bar of the shafts.

As the teeth of the bifurcated brace catch into those of the ratchet-wheels $d$, the pole or tongue, if placed horizontally or nearly so, will be held in such position with the same degree of power with which friction is applied to the sleeve by means of the nut D. Should the pole or tongue be carried down by a force exceeding that of the nut, the ratchet-arms will turn the sleeve while going backward on the wheels $d$. The arms will slip on the ratchet-wheels when the pole is again carried up.

This apparatus removes the weight of the tongue, pole, or shafts from the necks of the horses, and facilitates the management of the animals by causing their entire power to be concentrated to the draft.

Having thus described my invention,

I claim as new and desire to secure by Letters Patent—

1. The friction-sleeve, suspended from a wagon or other vehicle, and connected with the tongue, pole, or shafts by means of a brace, for the purpose of supporting said tongue, pole, or shafts, substantially as herein shown and described.

2. The shaft A, carrying the disks $b$ and nut D, and combined with the sleeve C, disks $a$, ratchet-wheels $d$, and brace E, all arranged to operate substantially as herein shown and described.

ANDREW J. MAPES.

Witnesses:
EDWIN A. HICKMAN,
HENRY CRUMP.